(No Model.)

J. W. WILLIAMS.
CORN AND COTTON PLANTER.

No. 352,595. Patented Nov. 16, 1886.

Witnesses.
A. Ruppert.
D. C. Reinohl

Inventor:
John W. Williams.
Per
Thomas P. Simpson,
Atty.

UNITED STATES PATENT OFFICE.

JOHN W. WILLIAMS, OF HUBBARD, TEXAS.

CORN AND COTTON PLANTER.

SPECIFICATION forming part of Letters Patent No. 352,595, dated November 16, 1886.

Application filed September 15, 1886. Serial No. 213,618. (No model.)

*To all whom it may concern:*

Be it known that I, JOHN W. WILLIAMS, a citizen of the United States, residing at Hubbard, in the county of Hill and State of Texas, have invented certain new and useful Improvements in Corn and Cotton Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention will first be described in connection with the drawings, and then clearly pointed out in the claims.

Figure 1:
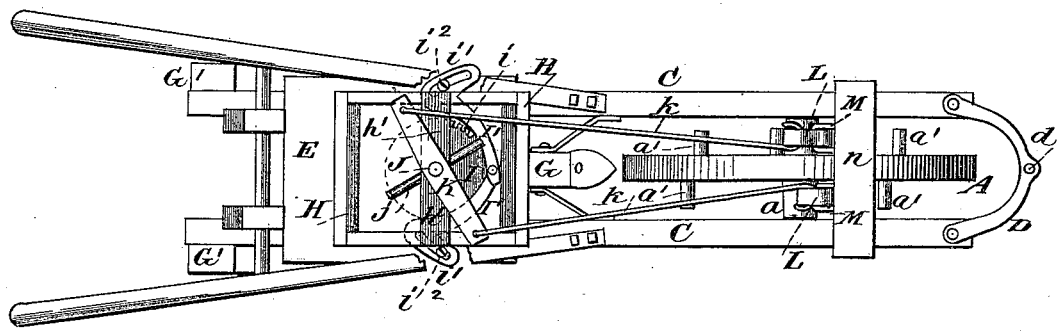
Figure 2:
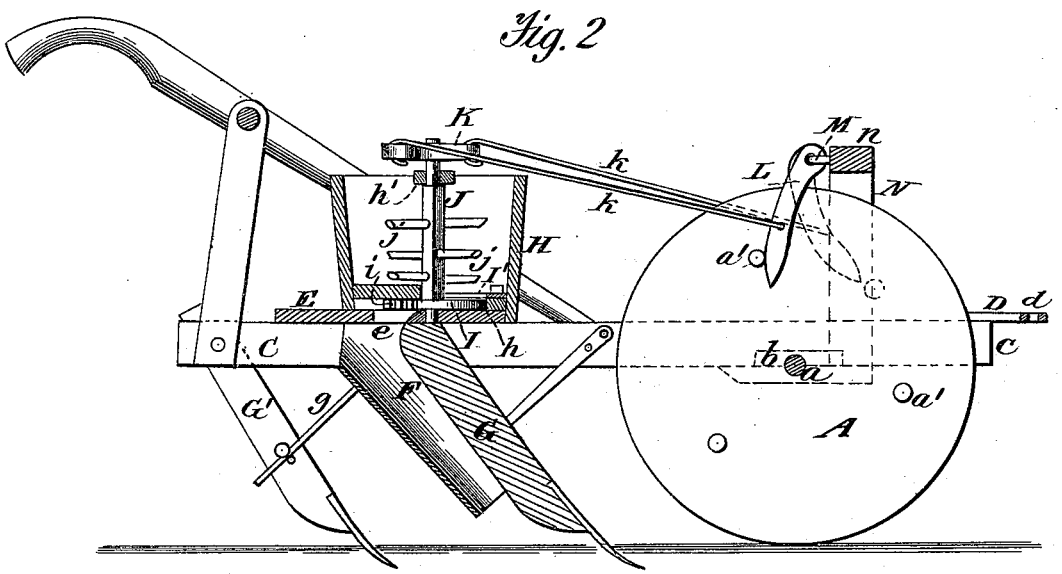
Figure 3:
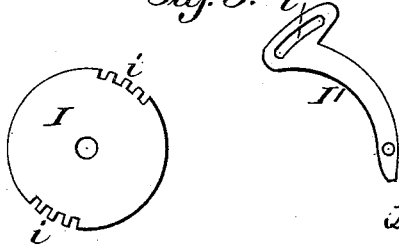

Figure 1 of the drawings is a plan view; Fig. 2, a median longitudinal vertical section; Fig. 3, a group of detail views.

In the drawings, A represents a front ground-wheel, having its shaft $a$ journaled in the bearings $b$ on the under side of the two parallel beams C C, these being connected in front by a curved metallic draft-bar, D, fastened at each end to one of said beams, and provided in the middle with a hole, $d$. At the rear end these beams are connected by a board or plate, E, which is apertured at $e$ over the discharge-spout F. The latter is formed of a sheet of metal fastened at the upper corners between and to the inside of the beams C C, while the lower corners overlap the sides of the standard G of the furrowing-plow. This construction causes the seed to drop into the furrow as the latter is made by the plow.

G' G' are the usual covering-plow standards, which may be provided with the braces $g$, connecting with the beams C.

H is the seed-hopper, having the bottom with a circular excision, $h$, in which fits and turns the horizontal feed-wheel I, notched at $i$. This is fast to the agitator-shaft J, carrying the arms $j$ above the feed-wheel. This shaft is bottom-pivoted in the board or plate E, while at top it is journaled in the hopper cross-bar $h'$, above which it extends, and is made fast to the equal-armed lever K. Each of the arms is connected by a wire or rod, $k$, with one of the pendent pivoted arms L, swinging on the eyes or loops M of the cross-bar $n$ of the frame N, supported on the beams C C. Each arm L swings on one side of and in close proximity to the wheel, which is provided on each side with the lateral studs $a'$, the number being determined by the distance apart at which the seed is to be planted. As the ground-wheel revolves, the studs strike the pivoted arms L, which vibrate the agitator and the feed-wheel, thus dropping the seed with great regularity and certainty.

My planter is adapted to drop corn, beans, peas, broom-seed, or sorghum.

When planting cotton, the feed wheel or disk is correspondingly notched on each side, and a pivoted plate, I', having the slotted arm $i'$, is arranged on each side of it, so that it may be set by a screw, $i^2$, so as to regulate the feed of the cotton seed.

Except the bolts and rods, my planter may be constructed entirely of wood. It is therefore economical in cost, while experiment has proved it to do its work in a very satisfactory manner.

Having thus described all that is necessary to a full understanding of my invention, what I claim as new, and desire to protect by Letters Patent, is—

1. In a planter, the upright frame N, supported on the beams C C and carrying the two pivoted arms L L, in combination with the wheel A, having studs on both sides, the wires $k$ $k$, and the lever middle fastened to the agitator-shaft, as and for the purpose specified.

2. In a planter, the combination, with a hopper having the circular excision $h$ in its bottom, of the horizontal feed-wheel I and arms $j$, fast to a vertical vibratory shaft, J, as shown and described.

In testimony whereof I affix my signature in presence of two witnesses.

JOHN W. WILLIAMS.

Witnesses:
W. W. WILLIAMS,
W. AUG. BASS.